(12) United States Patent
Kitagawa et al.

(10) Patent No.: US 12,695,318 B2
(45) Date of Patent: Jul. 28, 2026

(54) POWER SUPPLY SYSTEM

(71) Applicant: DENSO CORPORATION, Kariya-city (JP)

(72) Inventors: Masaaki Kitagawa, Kariya-city (JP); Masakazu Kouda, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 722 days.

(21) Appl. No.: 18/073,744

(22) Filed: Dec. 2, 2022

(65) Prior Publication Data

US 2023/0099142 A1 Mar. 30, 2023

Related U.S. Application Data

(63) Continuation of application No. PCT/JP2021/019610, filed on May 24, 2021.

(30) Foreign Application Priority Data

Jun. 4, 2020 (JP) ................................. 2020-097835

(51) Int. Cl.
 *H02J 7/50* (2026.01)
 *H02J 7/70* (2026.01)
 *H02J 7/96* (2026.01)

(52) U.S. Cl.
 CPC .............. *H02J 7/575* (2026.01); *H02J 7/751* (2026.01); *H02J 7/96* (2026.01)

(58) Field of Classification Search
 CPC .. H02J 7/0024; H02J 7/0045; H02J 7/007182; H02J 7/1423; B60L 3/00
 USPC ........................................................ 320/116
 See application file for complete search history.

(56) References Cited

U.S. PATENT DOCUMENTS

| | | | | |
|---|---|---|---|---|
| 8,878,547 B2 * | 11/2014 | Herraiz | ................... | G01R 27/18 |
| | | | | 324/520 |
| 10,771,002 B2 * | 9/2020 | Kim | ...................... | H02M 1/088 |
| 11,283,277 B2 * | 3/2022 | Hino | ................... | H01M 50/204 |
| 11,498,425 B2 * | 11/2022 | Yamaguchi | ............... | B60L 3/04 |
| 2007/0188137 A1 * | 8/2007 | Scheucher | .............. | B60L 53/80 |
| | | | | 320/116 |
| 2008/0050645 A1 * | 2/2008 | Kai | ......................... | B60L 50/64 |
| | | | | 429/93 |
| 2012/0015222 A1 | 1/2012 | Kosugi et al. | | |
| 2012/0052345 A1 | 3/2012 | Kai et al. | | |

(Continued)

FOREIGN PATENT DOCUMENTS

| | | | | |
|---|---|---|---|---|
| DE | 10 2017 202 236 B4 | 5/2018 | | |
| JP | 2004056881 A | * 2/2004 | ................ | H02P 9/08 |

(Continued)

OTHER PUBLICATIONS

JP6258719B2 (Machine Translation of Description). (Year: 2018).*

*Primary Examiner* — M Baye Diao

(74) *Attorney, Agent, or Firm* — Oliff PLC

(57) ABSTRACT

A power supply system includes an assembled battery, a positive electrode-side power supply path, a negative electrode-side power supply path, and a capacitor unit. The capacitor unit includes a series connection of a plurality of capacitors having one end connected to the positive electrode power supply path and the other end connected to the negative electrode power supply path. An inter-capacitor connection point located between the capacitors forming the series connection is electrically connected to the inter-cell connection point.

9 Claims, 13 Drawing Sheets

(56) References Cited

U.S. PATENT DOCUMENTS

| | | | | |
|---|---|---|---|---|
| 2013/0320766 A1* | 12/2013 | Ishishita | ................. | H02J 7/345 |
| | | | | 307/77 |
| 2017/0125995 A1* | 5/2017 | Nishi | ................... | H02H 1/0007 |
| 2017/0214254 A1* | 7/2017 | Kubo | .................... | H02J 7/0047 |
| 2018/0067158 A1* | 3/2018 | Kawamura | .......... | B60L 3/0069 |
| 2020/0235587 A1 | 7/2020 | Hino et al. | | |

FOREIGN PATENT DOCUMENTS

| | | | | | |
|---|---|---|---|---|---|
| JP | 5072727 | B2 | 11/2012 | | |
| JP | 2015-146690 | A | 8/2015 | | |
| JP | 2017147142 | A * | 8/2017 | ............ | Y02E 60/10 |
| JP | 6258719 | B2 * | 1/2018 | ............... | H02J 1/00 |

* cited by examiner

POWER SUPPLY SYSTEM

CROSS-REFERENCE TO RELATED APPLICATION

This application is a continuation application of International Application No. PCT/JP2021/019610 filed May 24, 2021 which designated the U.S. and claims priority to Japanese Patent Application No. 2020-097835 filed on Jun. 4, 2020, the contents of each of which are incorporated herein by reference.

BACKGROUND

Technical Field

The present disclosure relates to a power supply system to which an assembled battery configured by a plurality of battery cells connected in series is applied.

Related Art

Conventionally, an assembled battery configured by connecting a plurality of battery cells in series has been employed as a power supply in devices such as electric vehicles. Since such an assembled battery has a high voltage (for example, 400 V to 800 V), the high voltage circuit (high voltage system) including the assembled battery is electrically insulated from the vehicle body which the passengers or the like may touch.

DESCRIPTION OF SPECIFIC EMBODIMENTS

Figure 1:
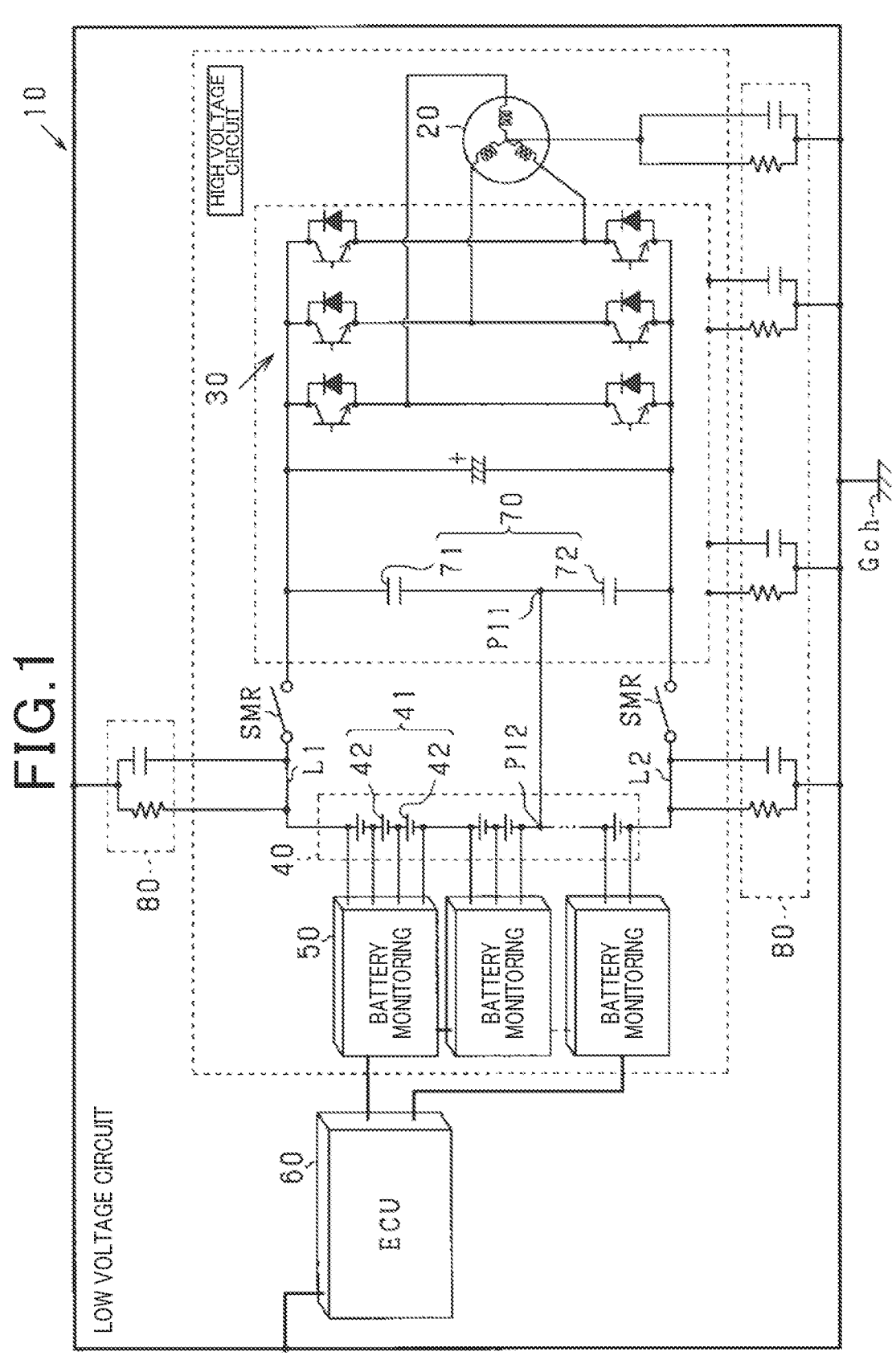
FIG. 1 is a circuit diagram of a power supply system.

In a known technique as disclosed in JP 5072727 B, a decrease in the insulation resistance between the high voltage circuit (high voltage system) including the assembled battery and the vehicle body is detected in order to ensure insulation. However, in recent years, there has been a tendency that the current flowing in high voltage circuits increases, and the noise caused by the current increases. Therefore, the capacitance of the capacitors for noise reduction has tended to increase. In addition, the voltage of assembled batteries has tended to increase due to vehicle requirements.

Under such circumstances, there is a concern that there may still be a risk of electrocution due to aerial discharge even when the insulation resistance has an appropriate value. To be more specific, when the potential difference between the high potential part and the vehicle body is a predetermined voltage or higher, and a worker approaches the high potential part during inspection and maintenance of the vehicle, aerial discharge occurs even if the worker does not touch it. Since this aerial discharge is generally an impulse discharge of 1 MHz or higher, the current that flows not only takes into account the DC insulation resistance but also the capacitance and inductance components. That is, when the capacitance increases and the voltage of the assembled battery increases as described above, even when the insulation resistance has an appropriate value, there is a risk that a large amount of electric current flows through, for example, a worker due to aerial discharge.

In view of the foregoing, it is desired to have a power supply system capable of suppressing the current caused to flow by aerial discharge.

A first means for solving the above problem is a power supply system to which an assembled battery configured by connecting a plurality of battery cells in series is applied, the power supply system including: a positive electrode-side power supply path connected to a positive electrode-side power supply terminal of the assembled battery; a negative electrode-side power supply path connected to a negative electrode-side power supply terminal of the assembled battery; and a capacitor unit connected to the power supply paths, wherein the capacitor unit is formed of a first capacitor having one end connected to the positive electrode-side power supply path and the other end connected to an inter-cell connection point provided between the battery cells in the assembled battery, or a second capacitor having one end connected to the negative electrode-side power supply path and the other end connected to the inter-cell connection point, or a series connection of a plurality of capacitors having one end connected to the positive electrode-side power supply path and the other end connected to the negative electrode-side power supply path, an inter-capacitor connection point located between the capacitors forming the series connection being electrically connected to the inter-cell connection point.

This makes is possible to prevent the impedance being reduced due to, for example, the vehicle body, which is used as the reference potential, being directly connected with the capacitor unit. Therefore, it is possible to prevent a large impulse current from flowing due to aerial discharge. Further, since the capacitor unit is connected to the inter-cell connection point, noise from, for example, the vehicle body via the capacitor unit can be suppressed.

A second means is a power supply system to which an assembled battery configured by connecting a plurality of battery cells in series is applied, the power supply system including: a power supply path connected to a power supply terminal of the assembled battery; and an access-preventing unit covering the assembled battery and the power supply paths to prevent access to the assembled battery and the power supply paths, wherein the assembled battery and the power supply paths are insulated from a ground member serving as a reference potential via an insulating member, and the access-preventing unit is electrically connected through a conductive connector.

The access-preventing unit prevents, for example, a worker from approaching a high voltage part such as the assembled battery so that aerial discharge caused by the worker approaching the high voltage part can be prevented. In addition, since the access-preventing unit has the same potential as the ground member thanks to the connector, it provides an electric shield for components such as the assembled battery, which in turn protects, for example, a worker from aerial discharge even if the worker touches the access-preventing unit.

First Embodiment

A first embodiment in which a "power supply system" is applied to a vehicle (for example, a hybrid vehicle or an electric vehicle) will be described below with reference to the drawings. The same or equivalent parts in the embodiments and modifications thereof described below are assigned with the same reference numbers, and an earlier explanation should be referred to for those parts having the same reference numbers.

As shown in FIG. 1, a power supply system 10 includes a motor 20 as a rotating electrical machine, an inverter 30 as a power converter that supplies a three-phase current to the motor 20, a rechargeable assembled battery 40, a battery monitoring device 50 that monitors the state of the assembled battery 40, and an ECU 60 that controls the motor 20 and other components.

The motor 20 is a vehicle propulsion motor and is capable of transmitting power to the drive wheels (not shown). In this embodiment, a three-phase permanent magnet synchronous motor is used as the motor 20.

The inverter 30 includes a full bridge circuit having the same number of upper and lower arms as the number of phases of the phase windings. The current flowing through each phase winding is adjusted by turning on and off a switch (semiconductor switching element) provided in each arm.

The inverter 30 is provided with an inverter controller (not shown) that controls energization by turning on and off the switches in the inverter 30 based on various kinds of detection information on the motor 20 and requests for exertion of driving force and electric power generation. This allows the inverter controller to supply electric power from the assembled battery 40 to the motor 20 via the inverter 30 to drive the motor 20. The inverter controller also causes the motor 20 to generate electric power based on the force from the drive wheels, and converts the generated power via the inverter 30 to supply it to the assembled battery 40 and charge the assembled battery 40.

The assembled battery 40 is connected to the motor 20 via the inverter 30. The assembled battery 40 has a voltage that becomes, for example, 100 V or higher, and includes a plurality of battery modules 41 connected in series. Each battery module 41 includes a plurality of battery cells 42 connected in series. Lithium-ion storage batteries or nickel hydrogen storage batteries may be used as the battery cells 42. The battery cells 42 are storage batteries each having an electrolyte and a plurality of electrodes.

The positive electrode-side terminal of an electric load such as the inverter 30 is connected to a positive electrode-side power supply path L1 connected to the positive electrode-side power supply terminal of the assembled battery 40. Similarly, the negative electrode-side terminal of the electric load such as the inverter 30 is connected to a negative electrode-side power supply path L2 connected to the negative electrode-side power supply terminal of the assembled battery 40. In the present embodiment, the positive electrode-side power supply path L1 includes all the paths that are connected to the positive electrode-side power supply terminal of the assembled battery 40 and have the same potential as the positive electrode-side power supply terminal. For example, the positive electrode-side power supply path L1 includes the path inside the casing (indicated by a broken line surrounding the inverter 30) of the inverter 30. The same applies to the negative electrode-side power supply path L2.

A relay switch SMR (system main relay switch) is provided in each of the positive and negative electrode-side power supply paths L1 and L2. The relay switches SMR enable switching between power conduction and interruption.

The battery monitoring devices 50 are devices for monitoring the state of charge (SOC) and the state of health (SOH) of the battery cells 42. A battery monitoring device 50 is provided for each battery module 41 or battery cell 42. The battery monitoring devices 50 are connected to the ECU 60 and outputs data such as the state of the battery cells 42.

Based on various kinds of information, the ECU 60 requests the inverter controller to exert driving force and generate electric power. The various kinds of information include, for example, the accelerator and brake operation information, the vehicle speed, and the state of the assembled battery 40.

Note that, in this embodiment, the high voltage circuit to which the voltage from the assembled battery 40 is input/output includes the motor 20, the inverter 30, the assembled battery 40, and the battery monitoring devices 50. The high voltage circuit is insulated from a chassis ground Gch, which serves as a reference potential, by an insulating member 80. The low voltage circuit to which a voltage lower than the voltage from the assembled battery 40 is input/output includes the ECU 60. The inverter controller may be included in the low voltage circuit. The reference potential of the low voltage circuit is the chassis ground Gch.

A noise removing element for removing noise is provided between the positive electrode-side power supply path L1 and the negative electrode-side power supply path L2. The noise removal element may be provided in a device forming the inverter 30. For example, as shown in the comparative example of FIG. 2, a Y-capacitor 100 for removing common-mode noise can be generally used as the noise removing element.

The Y-capacitor 100 is a series connection of two capacitors 100a and 100b, and the connection point between the capacitors 100a and 100b is connected to the chassis ground Gch, which is the reference potential. The chassis ground Gch is connected to, for example, the vehicle body (chassis), and has the same potential as the vehicle body. Noise is suppressed by the Y-capacitor 100.

However, in recent years, the increased voltage of the assembled battery 40 and the increased capacitance of the Y-capacitor 100 have raised the risk of electrocution due to aerial discharge. More specifically, in recent years, in devices such as electric vehicles, the voltage of the assembled battery 40 has been increased (400 to 800 V) in order to supply high energy to the driving system such as the motor 20 with minimum current. In addition, the increase in the amount of current flowing through the high voltage circuit has caused the current-induced noise to increase. To cope with this tendency, the capacitance of the Y-capacitor 100 tends to increase.

Under such circumstances, when, for example, a worker who performs maintenance, inspection, or the like of the vehicle approaches a power supply terminal of the assembled battery 40 or the power supply path L1 or L2 when the worker is in contact with the chassis ground Gch, aerial discharge may occur. Aerial discharge may occur when the potential difference reaches or exceeds a certain voltage (for example, 350V). That is, when the voltage of the assembled battery 40 is 400 to 800 V, aerial discharge may occur if, for example, a worker approaches the power supply path L1 or L2 or another part while the worker is in contact with the chassis ground Gch.

Figure 2:
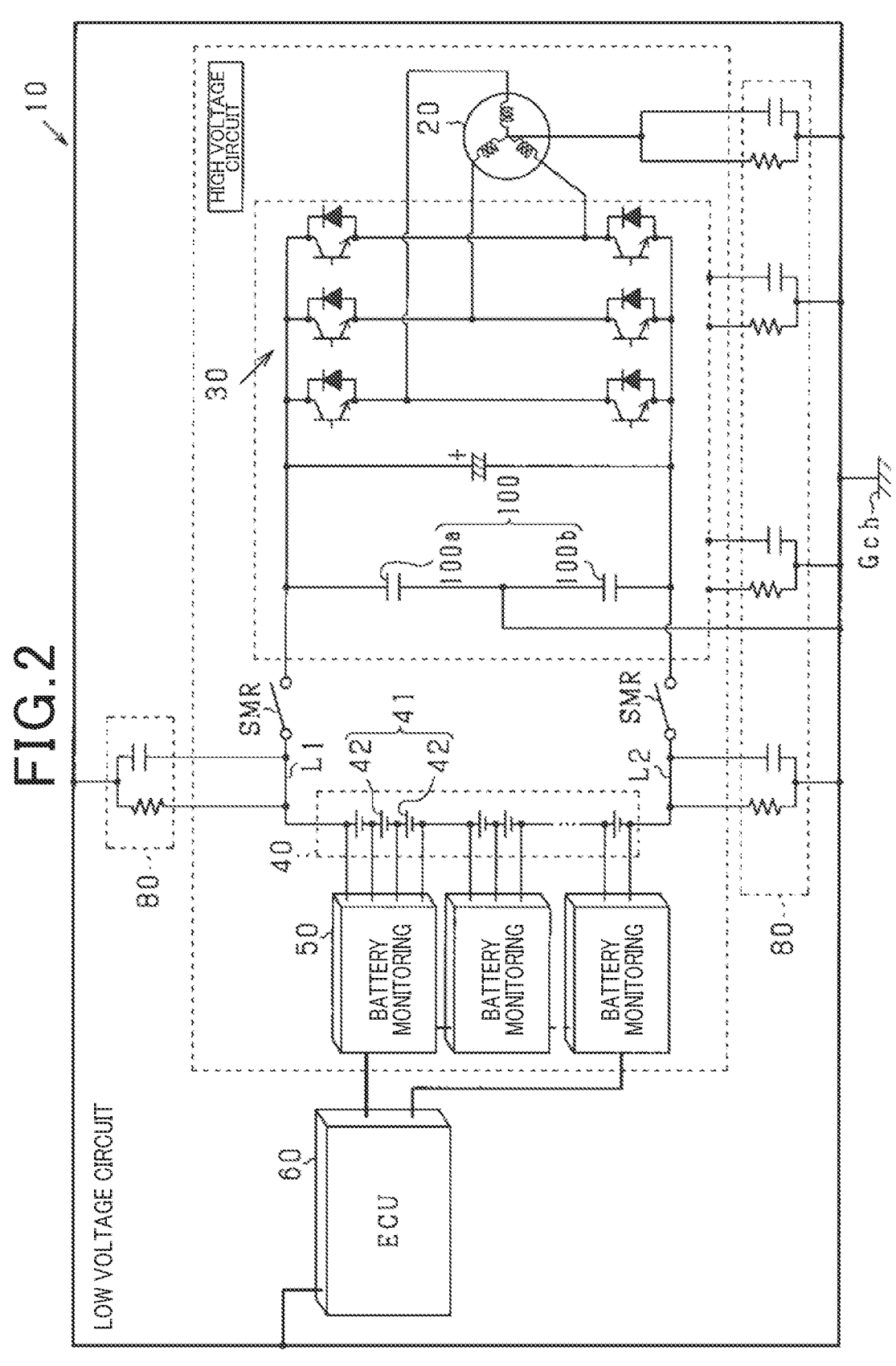
FIG. 2 is a circuit diagram of a power supply system according to a comparative example.
Figure 3:
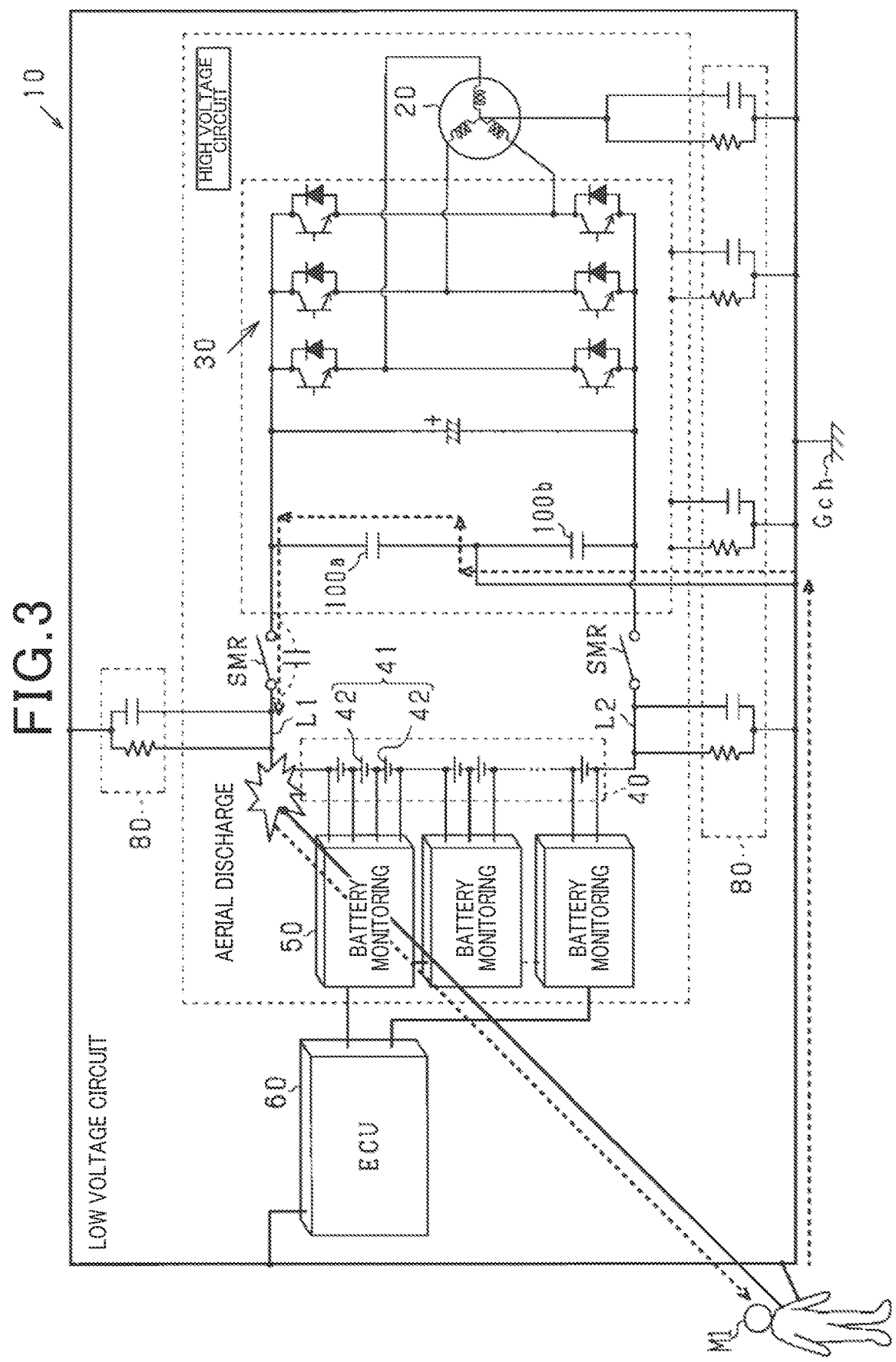
FIG. 3 is a view showing a current flow caused by aerial discharge according to the comparative example.

Since aerial discharge is generally an impulse discharge of 1 MHz or higher, the current that flows not only takes into account the DC insulation resistance but also the capacitance and inductance components. In the circuit diagram of the comparative example shown in FIG. 2, as shown in FIG. 3, an impulse current may flow in the following closed circuit: the origin of the aerial discharge→the worker M1→the chassis ground Gch→the positive electrode-side capacitor 100a→the positive electrode-side power supply path L1→the SMR (positive electrode side)→the origin of the aerial discharge.

Note that, even when the SMR is OFF (open), there is a stray capacitance in parallel with the SMR. Therefore, even when the SMR is OFF and has a large insulation resistance to the DC component, the AC component may flow. That is, an impulse current may flow. Needless to say, the impulse current flows more easily when the SMR is ON (closed).

Even if, for example, a worker is wearing insulating gloves or using another means to protects himself/herself, aerial discharge may occur more than once in succession. In this case, the initial discharge may carbonize the insulating gloves or other means and reduce their insulating performance, and subsequent discharges may cause current to flow.

In this embodiment, considering this risk, the power supply system 10 is configured as shown in FIG. 1. That is, the power supply system 10 includes the Y-capacitor 70 as a capacitor unit having one end connected to the positive electrode-side power supply path L1 and the other end connected to the negative electrode-side power supply path L2. The Y-capacitor 70 of this embodiment is a series connection of a plurality of capacitors, and includes a series connection of a first capacitor 71 and a second capacitor 72. In the Y-capacitor 70, a first connection point P11 as an inter-capacitor connection point between the first and second capacitors 71 and 72 is electrically connected to a second connection point P12 as an inter-cell connection point. The second connection point P12 is a connection point provided between battery cells 42 forming the assembled battery 40.

This second connection point P12 is the midpoint along the plurality of battery cells 42 connected in series in the assembled battery 40. In this embodiment, the total number of battery cells 42 constituting the assembled battery 40 is an even number. The number of battery cells 42 arranged between the positive electrode side power supply terminal (total positive terminal) of the assembled battery 40 and the second connection point P12, and the number of battery cells 42 arranged between the negative electrode-side power supply terminal (total negative terminal) of the assembled battery 40 and the second connection point P12 are the same. The assembled battery 40 includes battery cells 42 of the same standard. In other words, the assembled battery 40 includes battery cells 42 that have the same output voltage when they are in the same battery state. Therefore, the potential at the second connection point P12 is in the middle between the potential at the positive electrode-side power supply terminal and the potential at the negative electrode-side power supply terminal.

When the total number of battery cells 42 constituting the assembled battery 40 is an odd number, the positive electrode-side power supply terminal or negative electrode-side power supply terminal of the battery cell 42 located in the middle is used as the midpoint.

Figure 4:
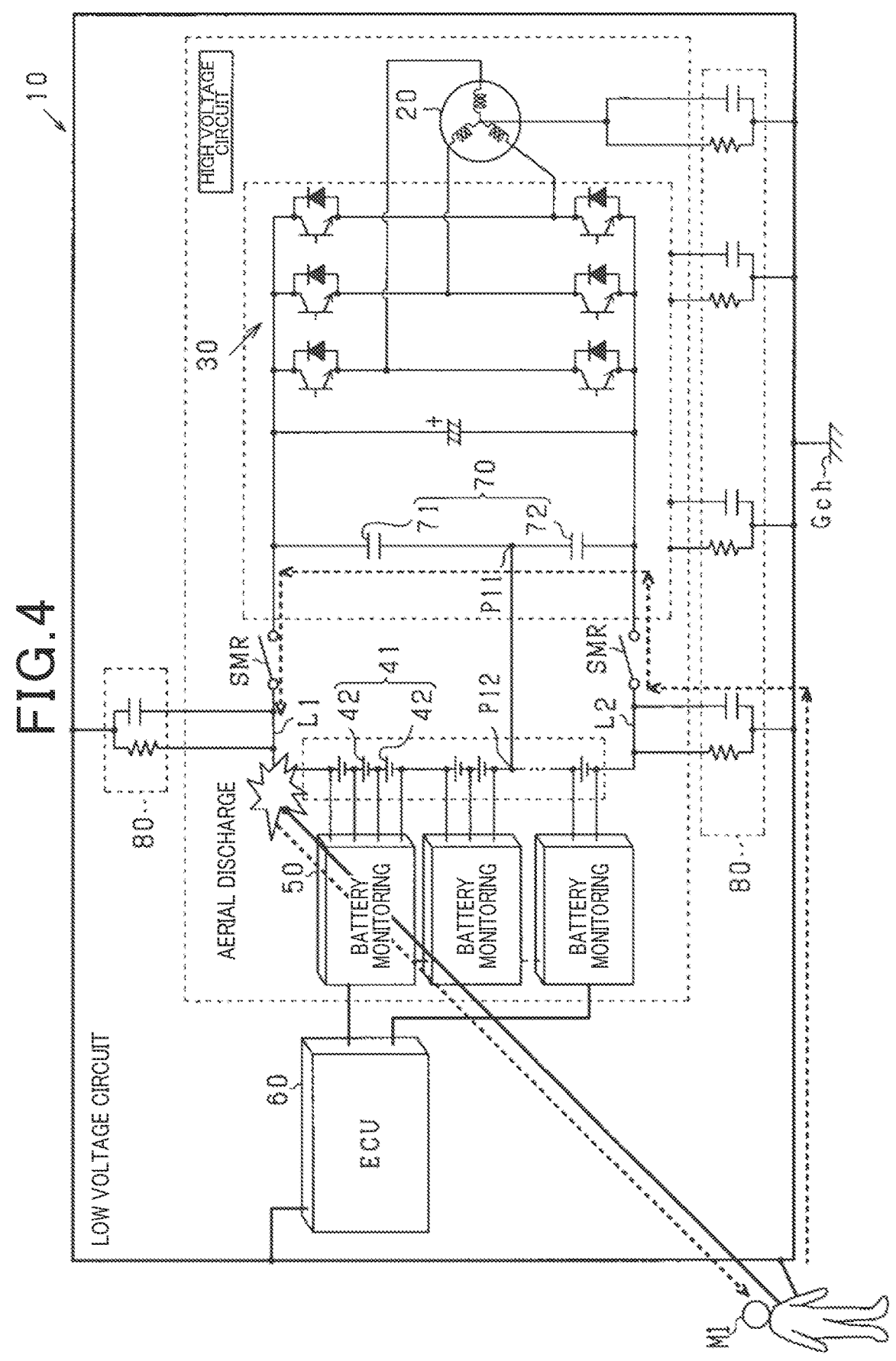
FIG. 4 is a diagram showing an example of a closed circuit.

Next, the operation of the above configuration will be described with reference to FIG. 4. As shown in FIG. 4, the following closed circuit is formed: the origin of the aerial discharge→the worker M1→the chassis ground Gch→the insulating member 80→the negative electrode-side power supply path L2→the SMR (negative electrode side)→the second capacitor 72→the first capacitor 71→the positive electrode-side power supply path L1→the SMR (positive electrode side)→the origin of the aerial discharge. This closed circuit is only an example, and a closed circuit passing through the motor 20, the inverter 30, and/or the like instead of the Y capacitor 70 is also possible. Since the low-impedance path from the chassis ground Gch to the intermediate connection point of the Y capacitor 70 is removed, a large current is unlikely to flow.

The advantageous effects of the first embodiment will be described.

In this power supply system 10, the first connection point P11 of the Y-capacitor 70 is electrically connected to the second connection point P12 provided between battery cells 42 forming the assembled battery 40. As a result, as shown in FIGS. 2 and 3, the low-impedance path from the chassis ground Gch to the Y-capacitor 100 is removed, which suppresses current flow based on aerial discharge and prevents electrocution.

In addition, the path from the chassis ground Gch to the Y-capacitor 100 is removed. Therefore, the noise generated in the motor 20 and the inverter 30 does not pass through, for example, as shown in FIG. 2, the path of the Y-capacitor 100→the chassis ground Gch→the ECU 60→the battery monitor 50→the assembled battery 40. In other words, the noise generated in the motor 20 and the inverter 30 flows the path of the Y-capacitor 70→the assembled battery 40, as shown in FIG. 1. Since the path including the chassis ground Gch, the ECU 60, and the battery monitoring device 50, which generate a lot of noise, is not taken, noise can be reduced.

The second connection point P12 is the midpoint along the plurality of battery cells 42 connected in series in the assembled battery 40. That is, the potential at the second connection point P12 is near the middle between the potential at the positive electrode-side power supply terminal and the potential at the negative electrode-side power supply terminal. Therefore, the potential difference from the negative electrode-side power supply terminal to the second connection point P12 and the potential difference from the second connection point P12 to the positive electrode-side power supply terminal become substantially the same, and the battery cells 42 output an equal amount of leakage current. Therefore, it is possible to suppress a variation in the state of charge of the battery cells 42.

Second Embodiment

Figure 5:
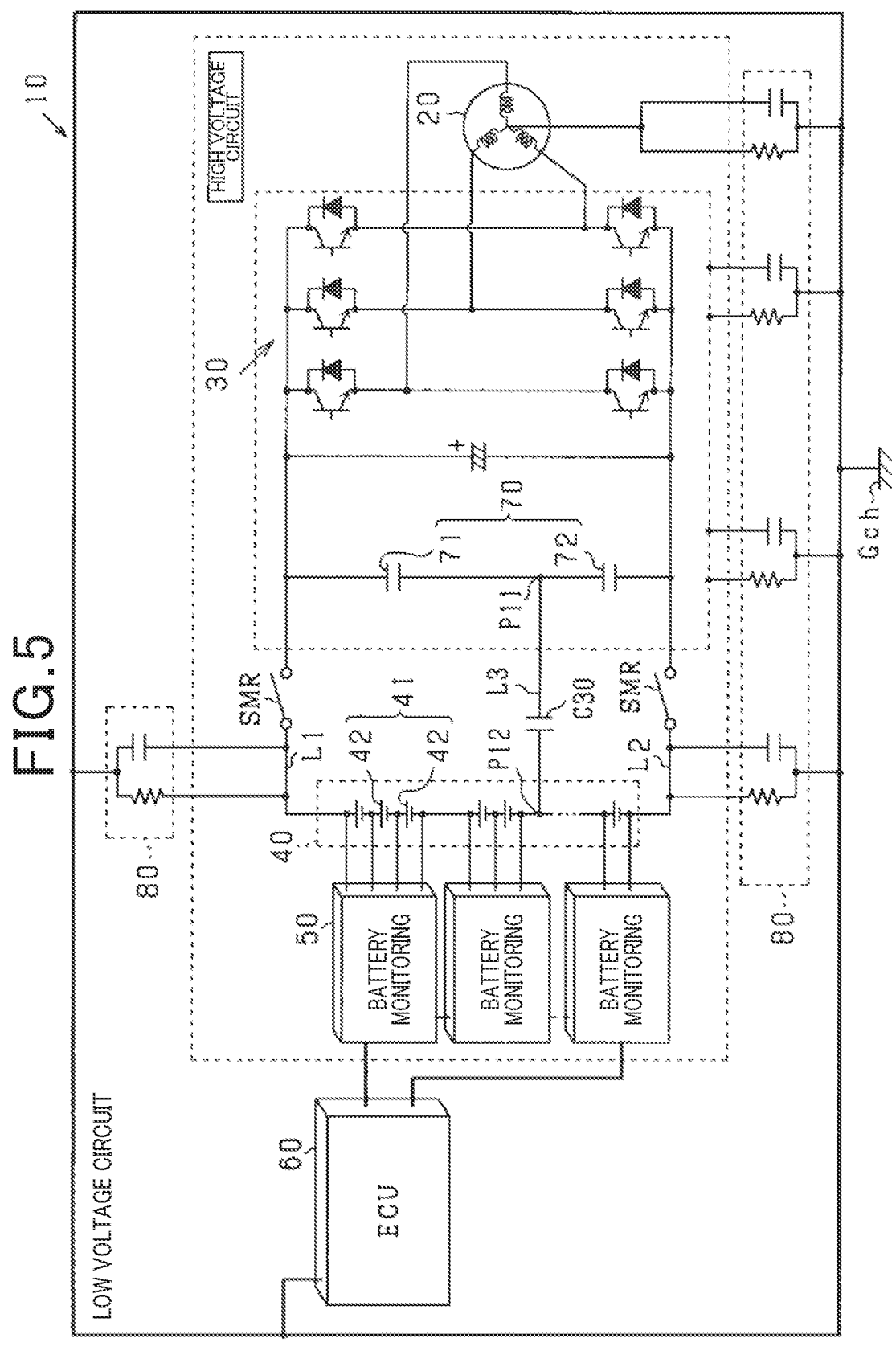
FIG. 5 is a circuit diagram of a power supply system according to a second embodiment.

A power supply system 10 according to the second embodiment will be described based on FIG. 5. As shown in FIG. 5, in the power supply system 10 of the second embodiment, a capacitor C30 as a third capacitor is provided in an electric path L3 between the first and second connection points P11 and P12. In this second embodiment, there may be a plurality of capacitors C30 connected in series.

According to the second embodiment, effects similar to those of the first embodiment can be obtained. That is, it is possible to prevent a large current from flowing due to aerial discharge and suppress noise. It is also possible to suppress a variation in the state of charge of the battery cells 42.

Further, by providing the capacitor C30, which has a high resistance to direct current, in the electrical path L3, leakage current (direct current) from the battery cells 42 can be suppressed. Note that, since the capacitor C30 allows high-frequency current (such as noise) to pass through, noise can be suppressed as in the first embodiment.

Third Embodiment

Figure 6:
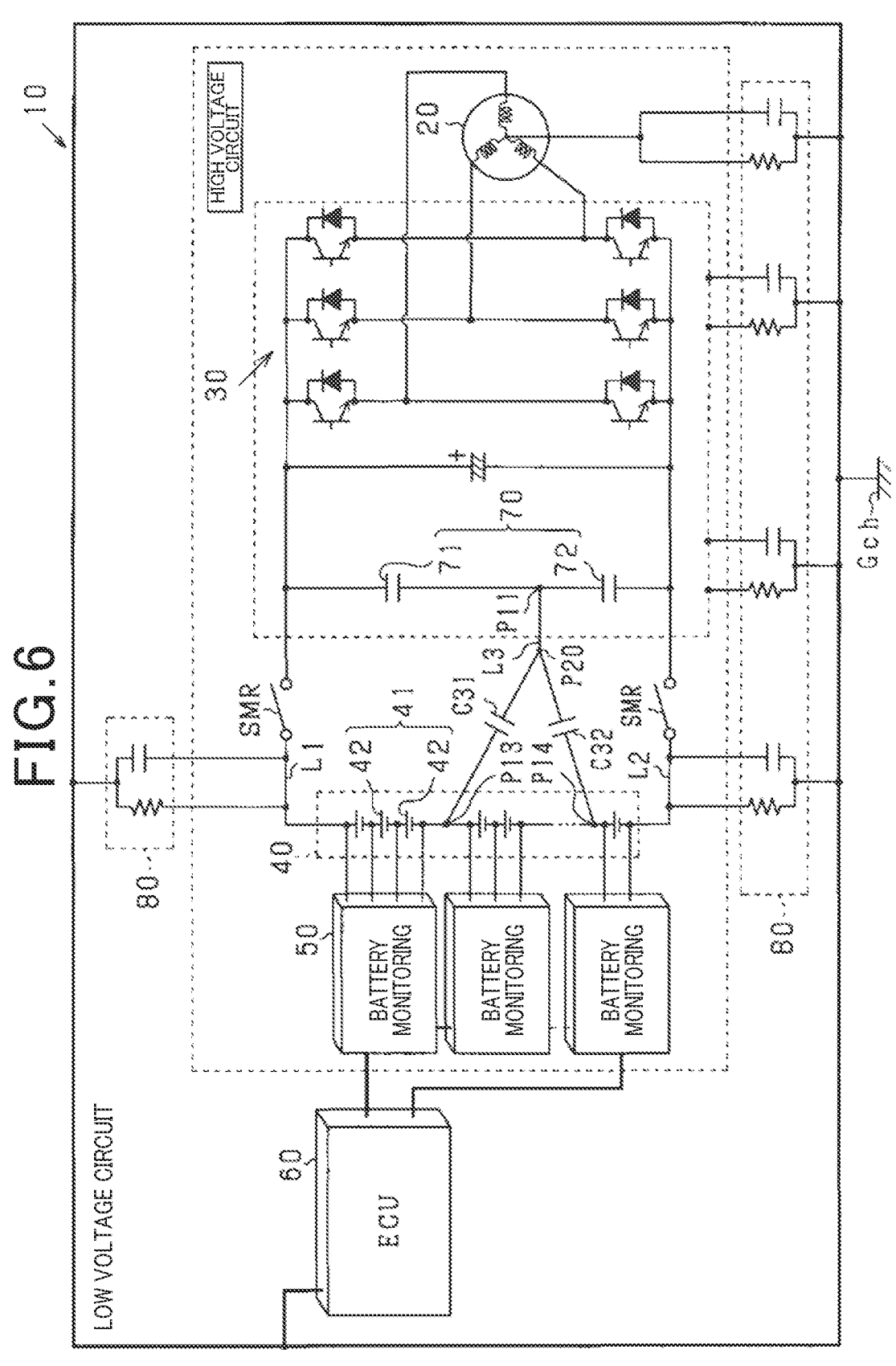
FIG. 6 is a circuit diagram of a power supply system according to a third embodiment.

A power supply system 10 according to the third embodiment will be described based on FIG. 6. As shown in FIG. 6, in the power supply system 10 of the third embodiment, the electric path L3 connected to the first connection point P11 of the Y-capacitor 70 branches, and the branched paths are connected to third and fourth connection points P13 and P14 as inter-cell connection points. That is, in the third embodiment, there are a plurality of inter-cell connection points, and the first connection point P11 of the Y-capacitor 70 is connected to the third and fourth connection points P13 and P14.

The electric path between a branch point P20 of the electric path L3 and the third connection point P13 is provided with a capacitor C31 as a third capacitor. Similarly, the electric path between the branch point P20 of the electric path L3 and the fourth connection point P14 is provided with a capacitor C32 as a third capacitor.

Although the electric path L3 is branched into two in the third embodiment, it may be branched into three or more. In that case, the number of inter-cell connection points can be set according to the number of branches. A third capacitor needs to be provided in each electric path between the branch point P20 of the electric path L3 and the corresponding inter-cell connection point.

In the third embodiment, the number of battery cells 42 arranged between the positive electrode-side power supply terminal of the assembled battery 40 and the third connection point P13, the number of battery cells 42 arranged between the third and fourth connection points P13 and P14, and the number of battery cells 42 arranged between the fourth connection point P14 and the negative electrode-side power supply terminal of the assembled battery 40 are preferably the same. This makes the battery cells 42 output an equal amount of leakage current and suppress a variation in the state of charge of the battery cells 42. When it is not possible to make the numbers of battery cells 42 exactly the same, they may be configured so that the difference is minimized, for example, one.

According to the third embodiment, effects similar to those of the first and second embodiments can be obtained.

Fourth Embodiment

Figure 7:
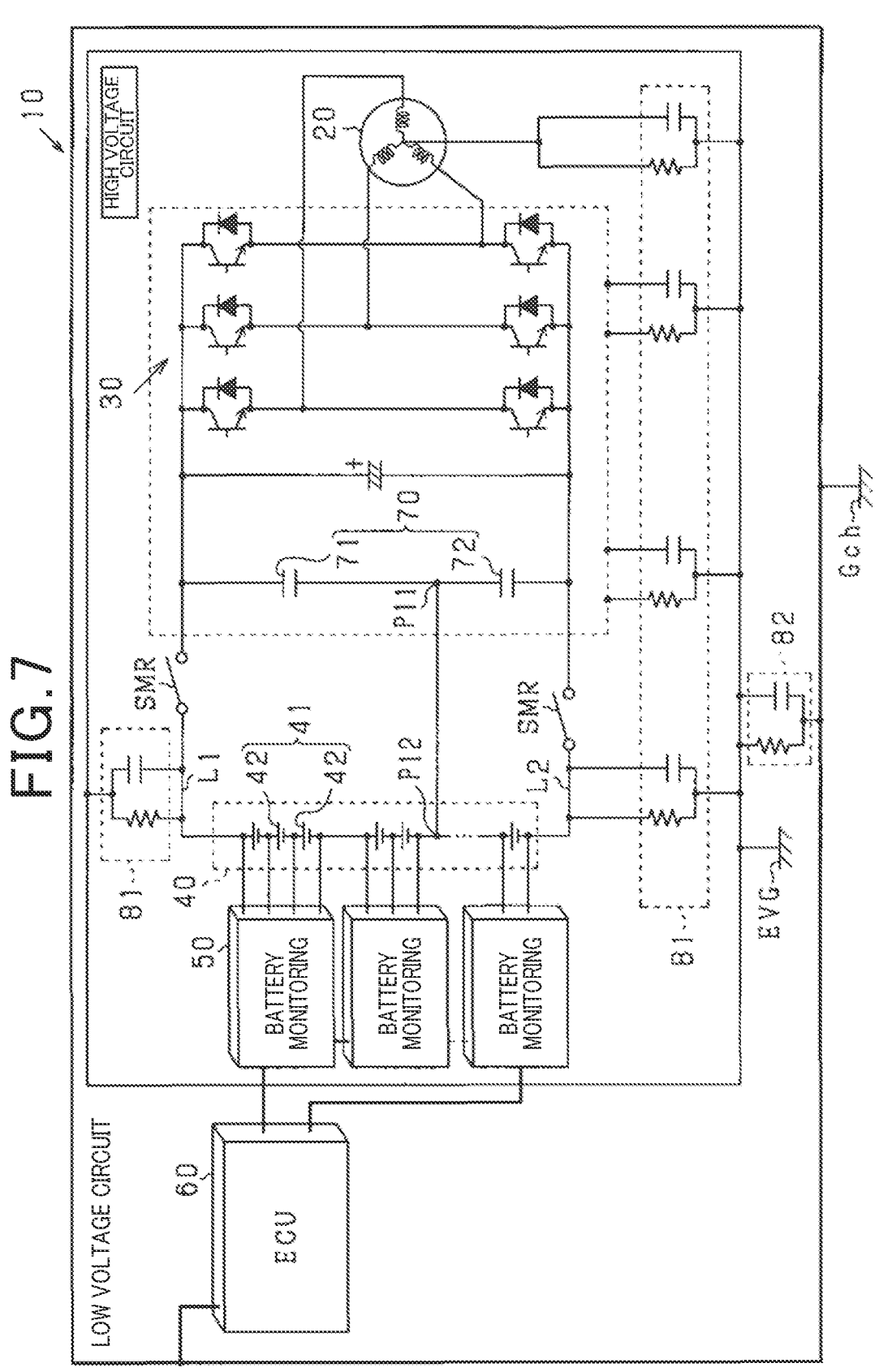
FIG. 7 is a circuit diagram of a power supply system according to a fourth embodiment.

A power supply system 10 according to the fourth embodiment will be described based on FIG. 7. As shown in FIG. 7, the power supply system 10 of the fourth embodiment is provided with a high voltage circuit ground EVG is provided as a first ground member. The high voltage circuit ground EVG is formed of a flat conductive plate. The high voltage circuit is placed on the high voltage circuit ground EVG with a first insulating member 81 interposed therebetween. The first insulating member 81 corresponds to, for example, an insulating sheet, a substrate, a case, or the like. The shape of the high voltage circuit ground EVG is not limited to a planar shape, and it may be in the form of a net or a lattice. It may also be a stranded wire or another machine component. The high voltage circuit may be surrounded (covered) by the high voltage circuit ground EVG with the first insulating member 81 interposed therebetween. This high voltage circuit ground EVG is made of an aluminum alloy, but may also be made of a conductive resin or another material. The high voltage circuit ground EVG is insulated from the chassis ground Gch by a second insulating member 82 as a second ground member.

Figure 8:
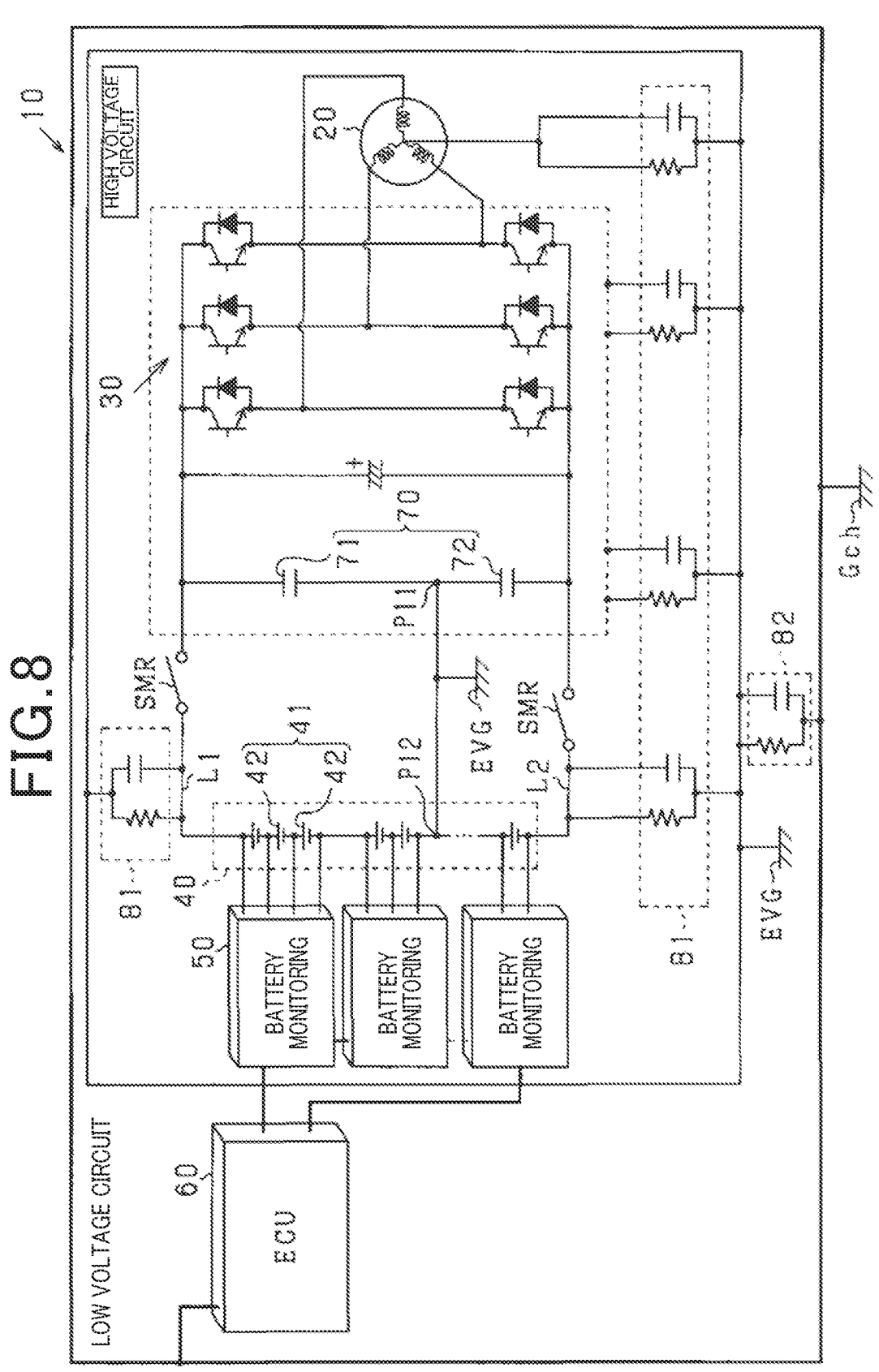
FIG. 8 is a circuit diagram of a power supply system according to a modification.

According to the fourth embodiment, by interposing the high voltage circuit ground EVG between the high voltage circuit and the chassis ground Gch, it is possible to reduce the stray capacitance between the chassis ground Gch and the high voltage circuit and increase the impedance. This further reduces noise. By covering the high voltage circuit, it can act as an electrostatic shield and suppress noise.
Modifications to Fourth Embodiment (M1) In the fourth embodiment, as shown in FIG. 8, the first connection point P11 of the Y-capacitor 70 may be connected to the high voltage circuit ground EVG.

Figure 9:
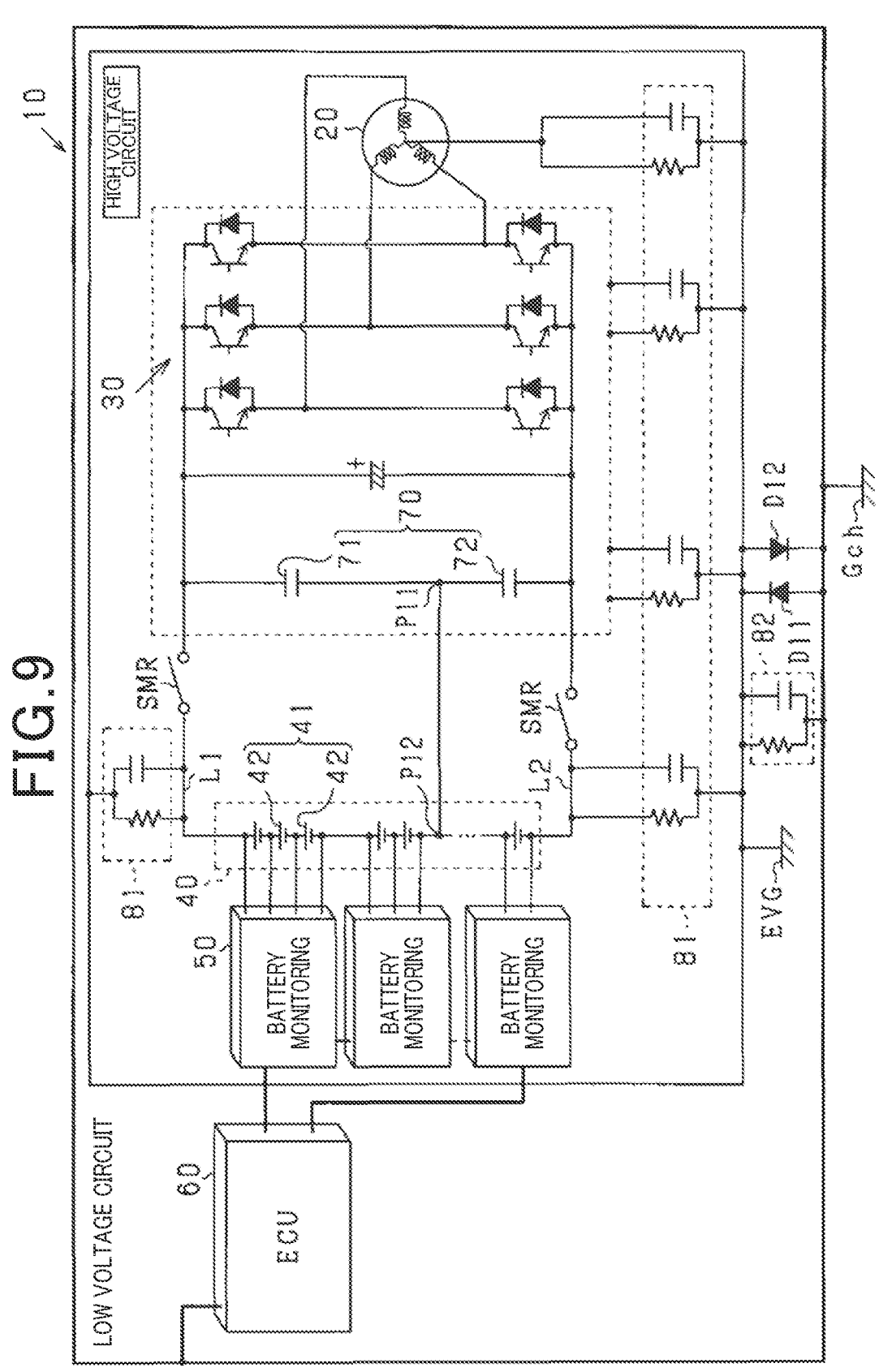
FIG. 9 is a circuit diagram of a power supply system according to a modification.

(M2) As shown in FIG. 9, the fourth embodiment may include a diode D11 as a first diode unit that allows current to pass from the high voltage circuit ground EVG to the chassis ground Gch, and a diode D12 as a second diode unit that allows current to flow from the chassis ground Gch to the high voltage circuit ground EVG. The diodes D11 and D12 can keep the potential difference between the chassis ground Gch and the high voltage circuit ground EVG equal to or below the operating voltage of the diodes. That is, it is possible to prevent the high voltage circuit ground EVG from electrostatically having a high voltage.

The modification shown in FIG. 9 may be altered so that each of the diodes D11 and D12 include a series connection of a plurality of diodes. It is also possible to connect a plurality of diodes D11 and D12 in parallel. Alternatively, the diodes D11 and D12 may each include a plurality of diodes connected in series, and a plurality of series-connections may be connected in parallel. This makes it possible to reduce coupling capacitance. It may also function as a redundant system in the event of a failure (short circuit or open circuit).

In place of the diodes D11 and D12, a component(s) having a function equivalent to that of the diodes may be employed. For example, part of an FET may be used.

Figure 10:
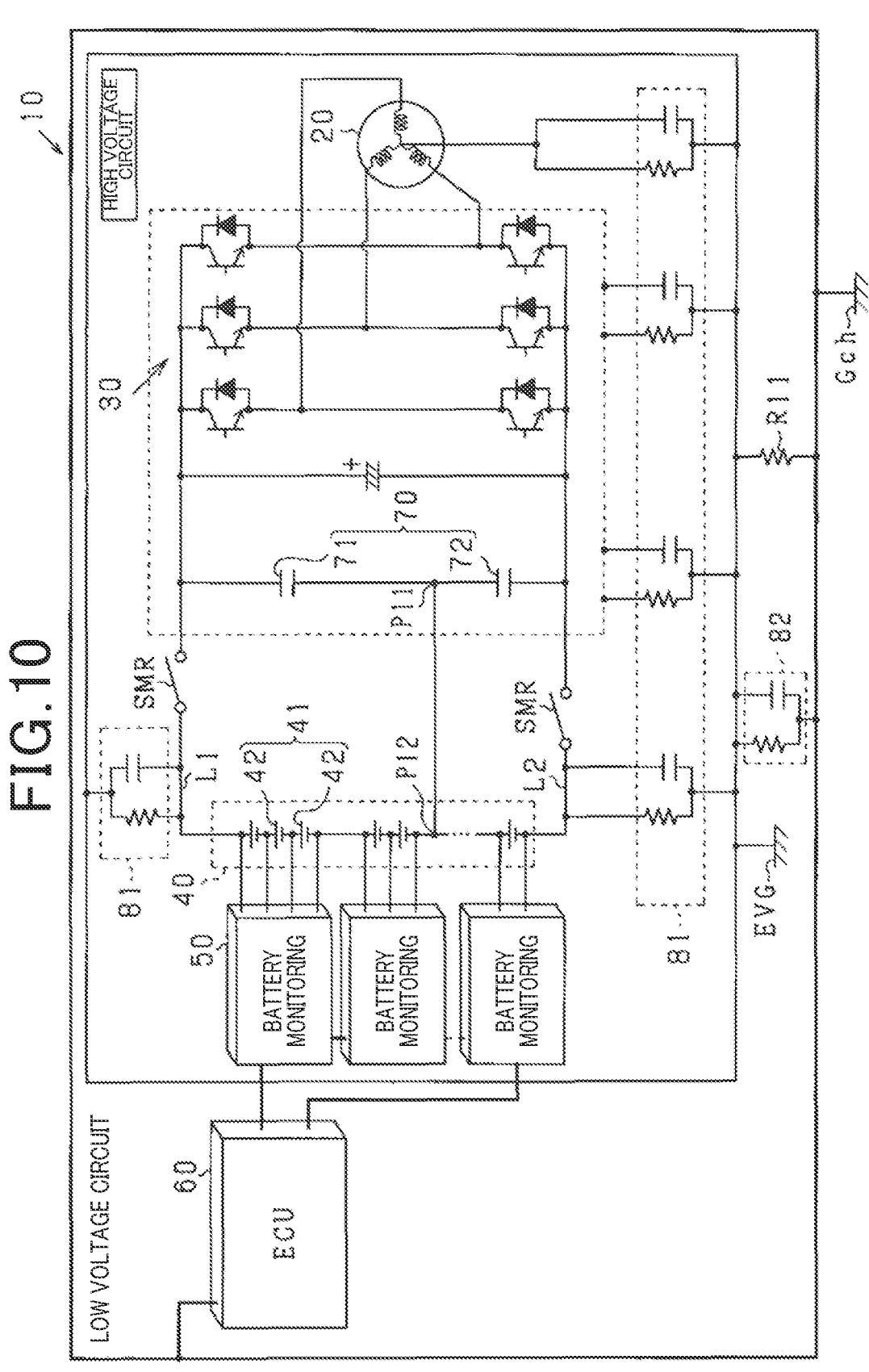
FIG. 10 is a circuit diagram of a power supply system according to a modification.

(M3) As shown in FIG. 10, the fourth embodiment may include a resistor R11 as a resistance unit connecting the high voltage circuit ground EVG and the chassis ground Gch. The resistance value of the resistor R11 is preferably lower than the maximum value of the insulation resistance of the second insulating member 82. This makes it possible to prevent the high voltage circuit ground EVG from electrostatically having a high voltage relative to the chassis ground Gch.

(M4) The configuration (high voltage circuit ground EVG) of the fourth embodiment and the configuration of any of the modifications of the fourth embodiment may be employed in the first to third embodiments.

Fifth Embodiment

Figure 11:
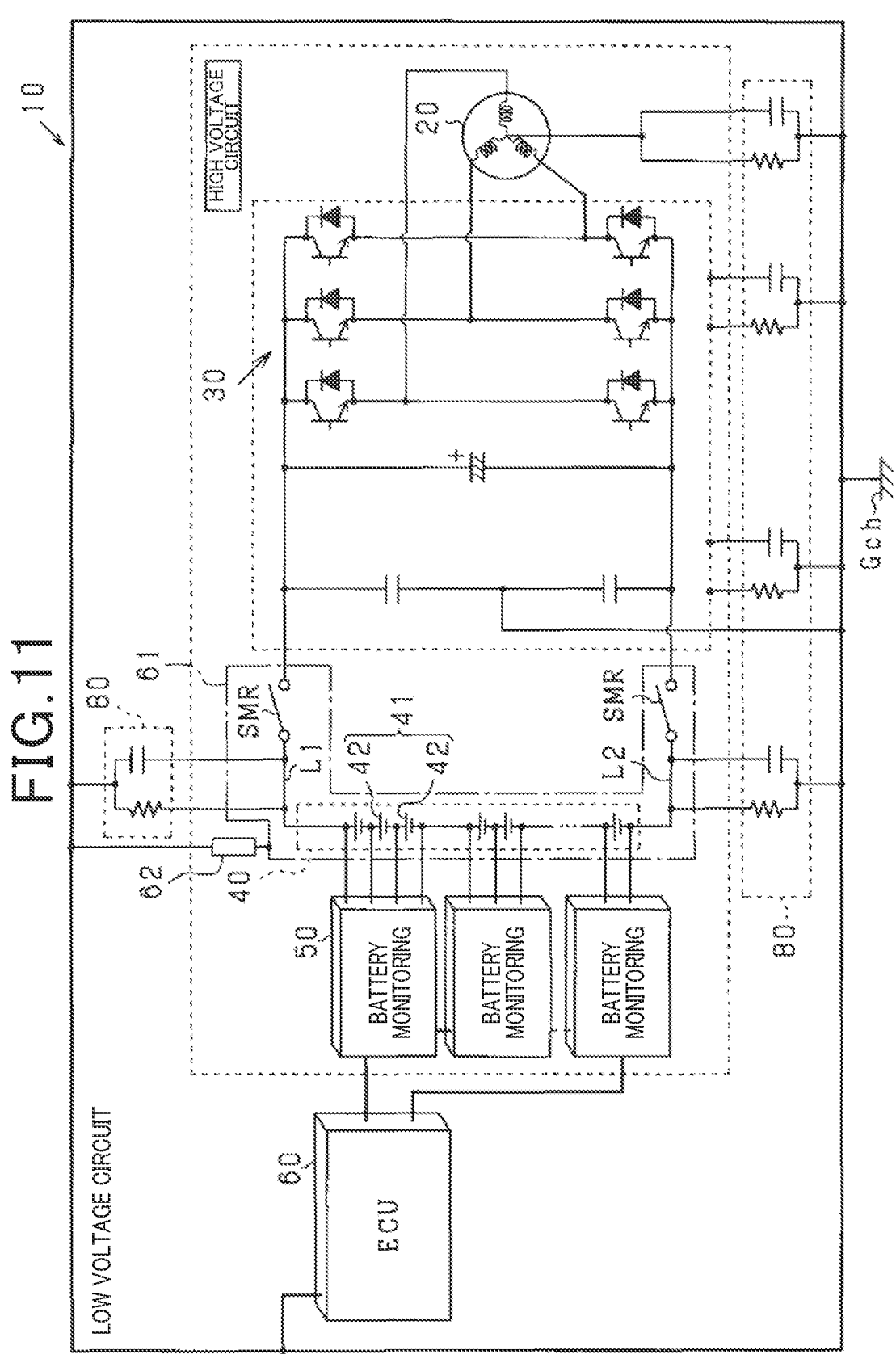
FIG. 11 is a circuit diagram of a power supply system according to a fifth embodiment.

Next, a power supply system 10 according to the fifth embodiment will be described. As shown in FIG. 11, the power supply system 10 of the fifth embodiment includes cover member 61 as a conductive access-preventing unit that covers the assembled battery 40 and the power supply paths L1 and L2 to prevent access to the assembled battery 40 and the power supply paths L1 and L2. The cover member 61 may be made of a metal plate, a conductive resin, or the like. The assembled battery 40 and the power supply paths L1 and L2 may be covered with separate cover members 61.

The cover member 61 may partially or entirely cover the power supply paths L1 and L2. When the parts of the power supply paths L1 and L2 inside the inverter 30 are covered with a case of the inverter 30 or the like, the parts of the power supply paths L1 and L2 outside the inverter 30 are preferably covered with the cover member 61. The cover member 61 is electrically connected to the chassis ground Gch via a connector 62 that is a conductive member or a resistor.

The cover member 61 can prevent, for example, the worker M1 from approaching the assembled battery 40 or another component, and thus aerial discharge can be prevented. That is, since the cover member 61 has the same potential as the chassis ground Gch thanks to the connector 62, it provides an electric shield for components such as the assembled battery 40, which in turn protects, for example, the worker M1 from aerial discharge.

Other Embodiments

Figure 12:
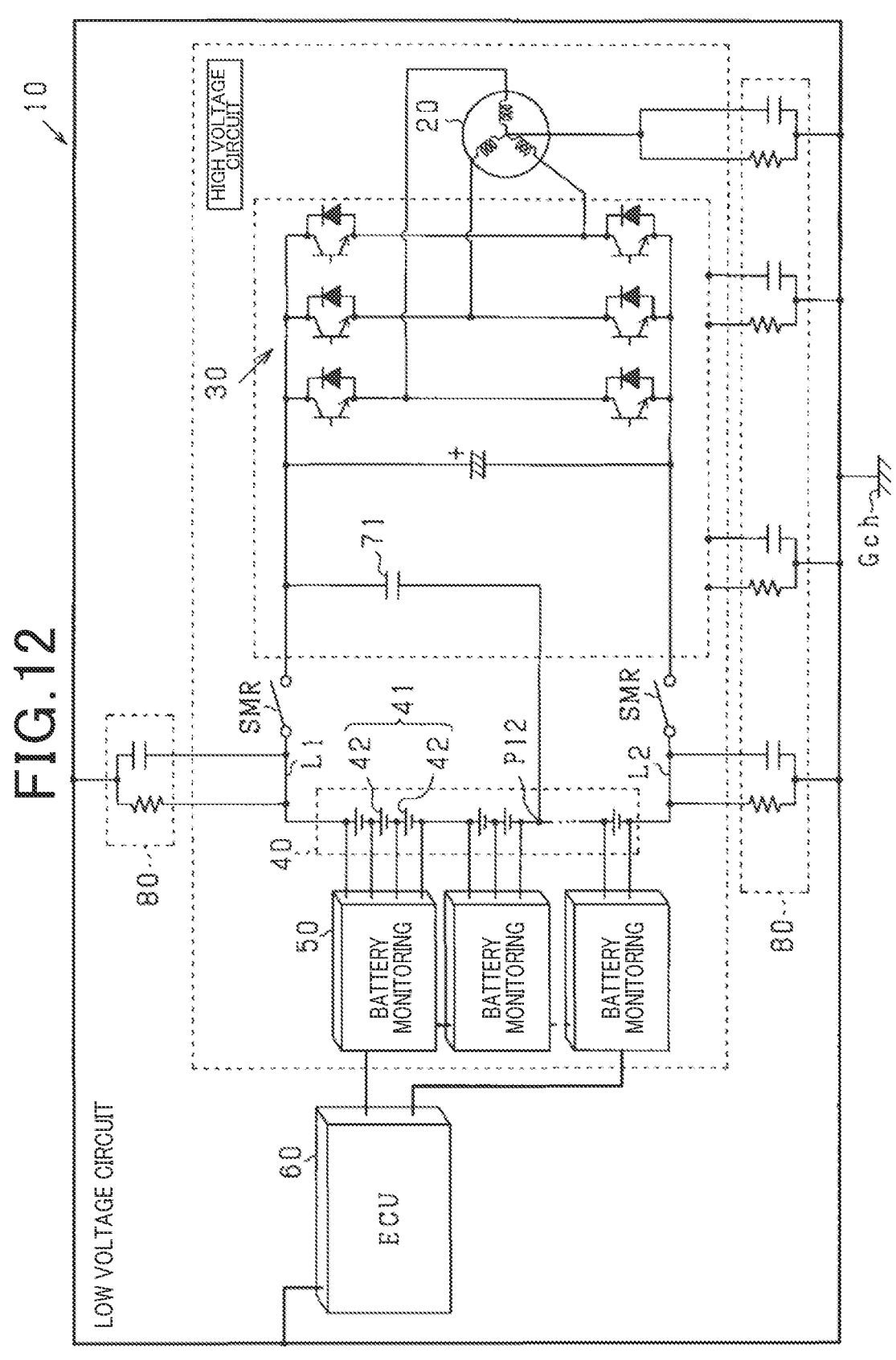
FIG. 12 is a circuit diagram of a power supply system according to another embodiment.
Figure 13:
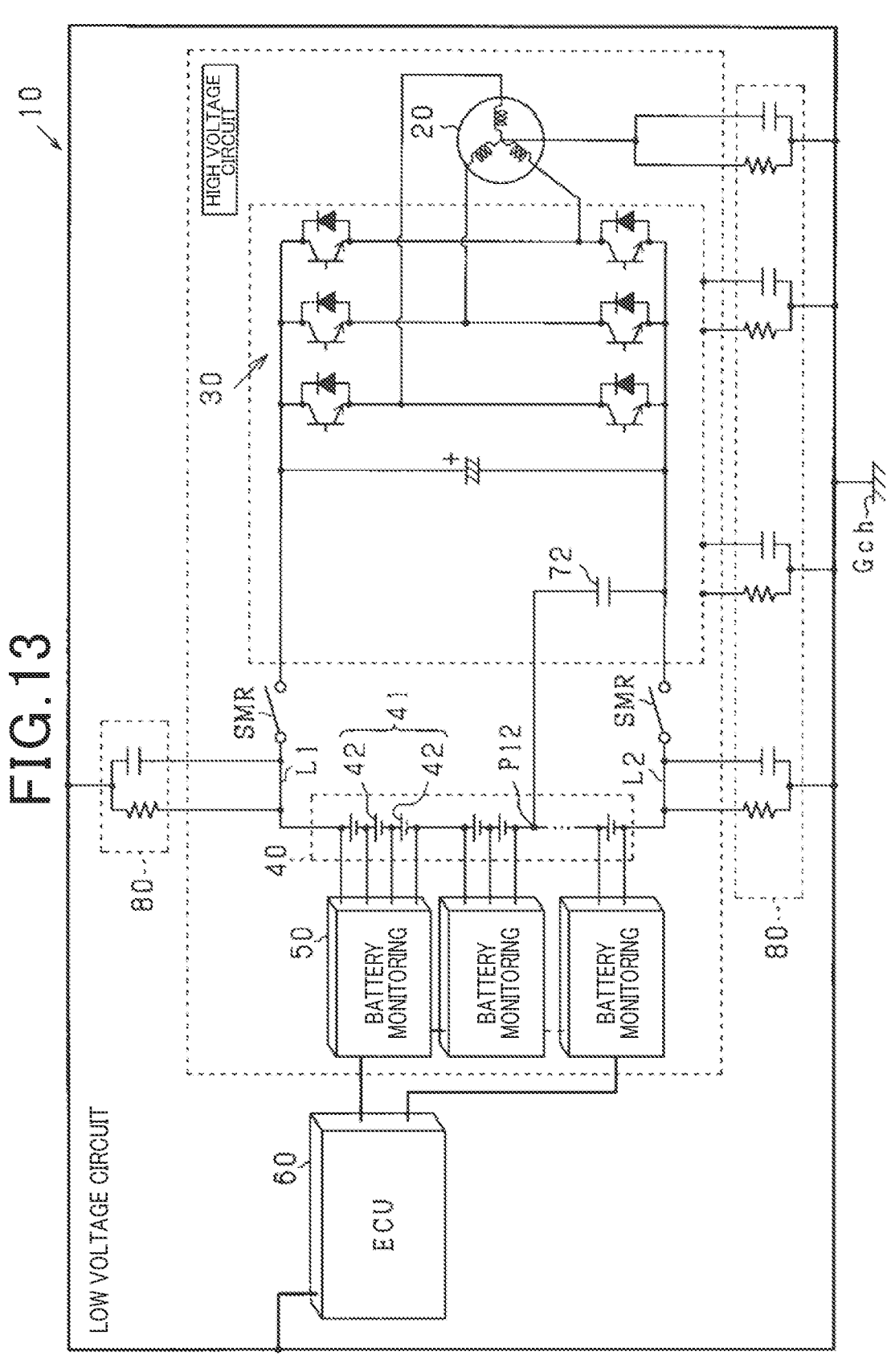
FIG. 13 is a circuit diagram of a power supply system according to another embodiment.

In the first to fourth embodiments and the modifications of the fourth embodiment, as shown in FIG. 12, the negative electrode-side second capacitor 72 forming part of the Y-capacitor 70 may be omitted. Similarly, as shown in FIG. 13, the positive electrode-side first capacitor 71 forming part of the Y-capacitor 70 may be omitted. It is still possible to prevent current from flowing due to aerial discharge as in the above-described embodiments and other examples. This also reduces noise.

(O1) In the above embodiments, the number of ECUs 60 is not limited to one, and there may be more than one ECU. In this case, for example, a battery monitoring ECU, a higher-level ECU, and/or the like may be provided. The battery monitoring ECU, the higher-level ECU, and/or the like will be included in the low voltage circuit.

(O2) In the above embodiments, the second to fourth connection points P12 to P14 may be modified as appropriate as long as they are connection points between battery cells 42.

(O3) In the above embodiments, the power supply system 10 may be employed in any device other than a vehicle, for example, an aircraft, as long as it uses the assembled battery 40 as a power supply.

(4) In the above embodiments, a booster circuit may be provided between the assembled battery 40 and the inverter 30 (or the Y-capacitor 70).

Although the present disclosure is described based on examples, it should be understood that the present disclosure is not limited to the described examples and structures. The present disclosure encompasses various modifications as well as changes within the scope of equivalence. In addition, the scope and the spirit of the present disclosure encompass various combinations and modes, and other combinations and modes including only one element thereof, and combinations and modes having more or less elements.

What is claimed is:

1. A power supply system to which an assembled battery configured by connecting a plurality of battery cells in series is applied, the power supply system comprising:

a positive electrode-side power supply path connected to a positive electrode-side power supply terminal of the assembled battery;

a negative electrode-side power supply path connected to a negative electrode-side power supply terminal of the assembled battery; and a capacitor unit connected to the power supply paths, wherein the capacitor unit comprises a first capacitor having one end connected to the positive electrode-side power supply path and the other end connected to an inter-cell connection point between the battery cells in the assembled battery, or a second capacitor having one end connected to the negative electrode-side power supply path and the other end connected to the inter-cell connection point, or a series connection of a plurality of capacitors having one end connected to the positive electrode-side power supply path and the other end connected to the negative electrode-side power supply path, an inter-capacitor connection point between the capacitors forming the series connection being electrically connected to the inter-cell connection point, and an electric path between the inter-cell connection point and the capacitor unit is insulated from a ground member.

2. The power supply system according to claim 1, wherein the inter-cell connection point is a midpoint along the plurality of battery cells connected in series in the assembled battery.

3. The power supply system according to claim 1, wherein a third capacitor is in an electric path connecting the capacitor unit and the inter-cell connection point.

4. The power supply system according to claim 3, comprising a plurality of the inter-cell connection points, and the capacitor unit is connected to each of the inter-cell connection points via the third capacitor.

5. The power supply system according to claim 1, further comprising a high voltage circuit including at least the assembled battery, the positive electrode-side power supply path, and the negative electrode-side power supply path, and a low voltage circuit whose input and output voltages are lower than input and output voltages of the high voltage circuit, wherein the high voltage circuit is on a first conductive ground member with a first insulating member interposed therebetween, or is surrounded by the first conductive ground member with the first insulating member interposed therebetween, the low voltage circuit is connected to a second conductive ground member, and the first conductive ground member is insulated from the second conductive ground member by a second insulating member.

6. The power supply system according to claim 5, wherein the first conductive ground member is connected to an electric path between the inter-cell connection point and the capacitor unit.

7. The power supply system according to claim 5, wherein the first conductive ground member is insulated from the second conductive ground member by the second insulating member, and the power supply system further comprises a first diode unit that allows current to pass from the first conductive ground member to the second conductive ground member, and a second diode unit that allows current to flow from the second conductive ground member to the first conductive ground member.

8. The power supply system according to claim 5, wherein the first conductive ground member is insulated from the second conductive ground member by the second insulating member, and the power supply system further comprises a resistance unit connecting the first conductive ground member and the second conductive ground member, and a resistance value of the resistance unit is lower than a maximum value of insulation resistance of the second insulating member.

9. The power supply system according to claim 1, wherein each of the power supply paths includes a relay switch for switching between power conduction and interruption of the power supply path.

\* \* \* \* \*